(12) United States Patent
Wen et al.

(10) Patent No.: US 12,229,893 B2
(45) Date of Patent: Feb. 18, 2025

(54) INFORMATION INTERACTION METHOD, COMPUTER-READABLE STORAGE MEDIUM AND COMMUNICATION TERMINAL

(71) Applicants: Beijing BOE Technology Development Co., Ltd., Beijing (CN); BOE TECHNOLOGY GROUP CO., LTD., Beijing (CN)

(72) Inventors: Ken Wen, Beijing (CN); Mingyuan Ma, Beijing (CN); Yongda Ma, Beijing (CN); Honglei Zhang, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/781,097

(22) PCT Filed: Mar. 30, 2021

(86) PCT No.: PCT/CN2021/084139
§ 371 (c)(1),
(2) Date: May 31, 2022

(87) PCT Pub. No.: WO2022/205001
PCT Pub. Date: Oct. 6, 2022

(65) Prior Publication Data
US 2024/0185530 A1    Jun. 6, 2024

(51) Int. Cl.
*G06T 15/00* (2011.01)
*G06F 3/04845* (2022.01)
(Continued)

(52) U.S. Cl.
CPC .......... *G06T 19/00* (2013.01); *G06F 3/04845* (2013.01); *G06F 3/0488* (2013.01);
(Continued)

(58) Field of Classification Search
CPC ............... G06F 3/0484; G06F 3/04842; G06F 3/04847; H04N 21/431
(Continued)

(56) References Cited

U.S. PATENT DOCUMENTS 5,548,789 A * 8/1996 Nakanura ............. H04L 51/212
                                                    379/88.08
5,596,362 A * 1/1997 Zhou ..................... H04N 19/17
                                                    348/700
(Continued)

FOREIGN PATENT DOCUMENTS

CN    101018314 A    8/2007
CN    101610421 A    12/2009
(Continued)

OTHER PUBLICATIONS

Hu C, Luo M. A Multimodal Discourse Analysis of Tmall's Double Eleven Advertisement. English Language Teaching. 2016;9(8): 156-69.*

(Continued)

*Primary Examiner* — Phu K Nguyen
(74) *Attorney, Agent, or Firm* — HOUTTEMAN LAW LLC

(57) ABSTRACT

An information interaction method, a computer-readable storage medium and a communication terminal are disclosed. The information interaction method is applied to a local terminal, and includes: in a process of a video call with a remote terminal, in response to a first interaction instruction, performing split-screen display on a display screen of the local terminal to form at least a first split screen for
(Continued)

displaying an interface of the video call and a second split screen for displaying a shopping interface; in response to a first selection instruction, acquiring an image of a commodity corresponding to the first selection instruction, with the first selection instruction being an instruction of selecting the commodity from the shopping interface; and displaying a synthesized image obtained by performing image synthesis on the image of the commodity and at least a part of images in the interface of the video call.

19 Claims, 9 Drawing Sheets

(51) Int. Cl.
| | | |
|---|---|---|
| G06F 3/0488 | (2022.01) | |
| G06T 7/11 | (2017.01) | |
| G06T 7/70 | (2017.01) | |
| G06T 17/00 | (2006.01) | |
| G06T 19/00 | (2011.01) | |
| G06V 20/40 | (2022.01) | |
| H04N 5/262 | (2006.01) | |

(52) U.S. Cl.
CPC .................. *G06T 7/11* (2017.01); *G06T 7/70* (2017.01); *G06T 17/00* (2013.01); *G06V 20/41* (2022.01); *H04N 5/2624* (2013.01); *G06T 2200/24* (2013.01); *G06T 2207/10016* (2013.01); *G06T 2207/20021* (2013.01); *G06T 2207/30196* (2013.01)

(58) Field of Classification Search
USPC .......................................................... 345/418
See application file for complete search history.

(56) References Cited

U.S. PATENT DOCUMENTS

| | | | | |
|---|---|---|---|---|
| 5,659,625 | A * | 8/1997 | Marquardt | G06V 40/171 |
| | | | | 382/254 |
| 5,896,128 | A * | 4/1999 | Boyer | H04N 7/152 |
| | | | | 348/14.09 |
| 6,539,100 | B1 * | 3/2003 | Amir | G06V 40/18 |
| | | | | 382/173 |
| 7,877,443 | B2 * | 1/2011 | Lyle | H04L 12/1822 |
| | | | | 709/204 |
| 8,903,130 | B1 * | 12/2014 | Carceroni | H04N 7/147 |
| | | | | 382/173 |
| 2008/0163344 | A1 | 7/2008 | Yang | |
| 2013/0268357 | A1 * | 10/2013 | Heath | G06Q 10/10 |
| | | | | 726/26 |
| 2015/0381930 | A1 * | 12/2015 | Quinn | H04N 7/147 |
| | | | | 348/14.14 |
| 2019/0156404 | A1 | 5/2019 | Gabriele et al. | |
| 2019/0197599 | A1 | 6/2019 | Zia et al. | |
| 2019/0332000 | A1 * | 10/2019 | DeMeo | F16M 11/38 |
| 2021/0132790 | A1 * | 5/2021 | Kim | G06F 3/0484 |

FOREIGN PATENT DOCUMENTS

| | | | |
|---|---|---|---|
| CN | 103220490 | A | 7/2013 |
| CN | 103473027 | A | 12/2013 |
| CN | 103716227 | A | 4/2014 |
| CN | 104219197 | A | 12/2014 |
| CN | 104750450 | A | 7/2015 |
| CN | 105243549 | A | 1/2016 |
| CN | 105975071 | A | 9/2016 |
| CN | 106157073 | A | 11/2016 |
| CN | 106681711 | A | 5/2017 |
| CN | 106708452 | A | 5/2017 |
| CN | 108259810 | A | 7/2018 |
| CN | 108377410 | A | 8/2018 |
| CN | 108447043 | A | 8/2018 |
| CN | 108876936 | A | 11/2018 |
| CN | 109040643 | A | 12/2018 |
| CN | 110177250 | A | 8/2019 |
| CN | 110611849 | A | 12/2019 |
| CN | 111405343 | A | 7/2020 |
| CN | 111752448 | * | 10/2020 |
| CN | 111752448 | A | 10/2020 |
| CN | 111913630 | A | 11/2020 |
| CN | 111935489 | A | 11/2020 |
| CN | 112184359 | A | 1/2021 |
| CN | 112187619 | A | 1/2021 |
| CN | 112367532 | A | 2/2021 |
| WO | WO 99/57900 | * | 5/1999 |

OTHER PUBLICATIONS

Hsieh CW, Chen CY, Chou CL, Shuai HH, Liu J, Cheng WH. FashionOn: Semantic-guided image-based virtual try-on with detailed human and clothing information. InProceedings of the 27th ACM international conference on multimedia Oct. 15, 2019 (pp. 275-283).*

China Patent Office, CN202180000654.2 First Office Action issued on Nov. 29, 2023.

* cited by examiner

INFORMATION INTERACTION METHOD, COMPUTER-READABLE STORAGE MEDIUM AND COMMUNICATION TERMINAL

TECHNICAL FIELD

The present disclosure relates to the field of display technology, and in particular, to an information interaction method, a computer-readable storage medium and a communication terminal.

BACKGROUND

With the rapid development of the internet industry, online shopping by using the internet has become a more and more common thing in people's lives. In some intelligent shopping scenes, a user stands in front of an electronic device, and the electronic device acquires an image of the user, synthesizes and displays an image of a commodity selected by the user and the image of the user, thereby realizing an online try-on effect.

SUMMARY

The present disclosure provides an information interaction method, a computer-readable storage medium and a communication terminal.

In a first aspect, the present disclosure provides an information interaction method which is applied to a local terminal and includes:
  in a process of a video call with a remote terminal, in response to a first interaction instruction, performing split-screen display on a display screen of the local terminal to form at least a first split screen and a second split screen, where the first split screen is configured to display an interface of the video call, and the second split screen is configured to display a shopping interface;
  in response to a first selection instruction, acquiring an image of a commodity corresponding to the first selection instruction; where the first selection instruction is an instruction of selecting the commodity from the shopping interface; and
  displaying a synthesized image, where the synthesized image is an image obtained by performing image synthesis on the image of the commodity and at least a part of images in the interface of the video call.

In some implementations, the interface of the video call includes: a local video window configured to display images collected by the local terminal and a remote video window configured to display images collected by the remote terminal; and
  before displaying the synthesized image, the method further includes:
  acquiring at least one human image from images displayed in the local video window as a target human image; and
  synthesizing the image of the commodity and the target human image to obtain the synthesized image; or sending the target human image to a server, and receiving the synthesized image sent by the server.

In some implementations, the first selection instruction is an instruction generated according to a click operation applied onto the shopping interface, or an instruction generated according to a first sliding operation applied onto the shopping interface; the click operation includes: an operation of clicking the shopping interface through touch, or an operation of clicking the shopping interface through an air gesture; and the first sliding operation includes: an air gesture operation of moving from the shopping interface to the interface of the video call, or a touch operation of moving from the shopping interface to the interface of the video call; and
  the acquiring at least one human image from images displayed in the local video window as a target human image specifically includes:
  when the first selection instruction is an instruction generated according to the click operation, detecting the number of human images in the local video window, and taking the human image as the target human image when one human image exists in the local video window; when the number of human images in the local video window is greater than 1, outputting an object selection request to remind a user to input object selection information; and when the object selection information input by the user is received, determining the target human image according to the object selection information; and
  when the first selection instruction is an instruction generated according to the first sliding operation, determining the target human image according to a path of the first sliding operation on the display screen.

In some implementations, the information interaction method further includes:
  detecting the number of human images in the local video window, and when a plurality of human images exist in the local video window, dividing the local video window into a plurality of local video sub-windows, each local video sub-window displaying one of the human images.

In some implementations, after synthesizing the image of the commodity and the target human image, the method further includes:
  sending the synthesized image to the remote terminal or the server.

In some implementations, the information interaction method further includes:
  in response to the first selection instruction, acquiring link information of the commodity corresponding to the first selection instruction; and
  displaying the link information of the commodity in the local video window, and sending the link information to the remote terminal or the server.

In some implementations, the information interaction method further includes:
  in response to a commodity recommendation instruction, acquiring information of a commodity corresponding to the commodity recommendation instruction;
  according to the information of the commodity corresponding to the commodity recommendation instruction, sending a reminding message to the remote terminal for a user of the remote terminal to select whether to accept a commodity recommendation; and
  in response to an acceptance instruction of the user of the remote terminal, synthesizing an image of the commodity corresponding to the commodity recommendation instruction and at least one human image in the remote video window.

In some implementations, the information interaction method further includes:
  in response to a comparison instruction, acquiring at least two synthesized images generated in a history record of the video call, and displaying the at least two synthesized images for comparison; where the at least two synthesized images include at least two first synthesized images, or at least two second synthesized images, or at least one first synthesized image and at least one second synthesized image; and the first synthesized image is a synthesized image of a human image in the local video window and the image of the commodity, and the second synthesized image is a synthesized image of a human image in the remote video window and the image of the commodity.

In some implementations, the, in response to a comparison instruction, acquiring at least two synthesized images generated in a history record of the video call, and displaying the at least two synthesized images for comparison specifically includes:

in response to a first comparison instruction, acquiring at least two first synthesized images generated in the history record of the video call, and displaying the acquired first synthesized images for comparison;

in response to a second comparison instruction, acquiring at least two second synthesized images generated in the history record of the video call, and displaying the acquired second synthesized images for comparison; and in response to a third comparison instruction, acquiring at least one first synthesized image and at least one second synthesized image generated in the history record of the video call, and displaying the first synthesized image in a local video window of a current video call and displaying the second synthesized image in a remote video window of the current video call.

In some implementations, the interface of the video call includes: a local video window and a remote video window, the remote video window is configured to display images collected by the remote terminal; and the information interaction method further includes:

in response to a second interaction instruction, acquiring a pre-stored three-dimensional human model diagram of a local user from the local terminal, or performing image acquisition to acquire the three-dimensional human model diagram of the local user;

in response to a second selection instruction, acquiring a three-dimensional model diagram of a commodity corresponding to the second selection instruction;

synthesizing the three-dimensional human model diagram and the three-dimensional model diagram of the commodity to generate a first synthesized model diagram; and displaying the first synthesized model diagram in the local video window, and sending the first synthesized model diagram to the remote terminal or the server.

In some implementations, the interface of the video call includes: a local video window and a remote video window; and the information interaction method further includes:

in response to a window creation instruction, creating a sharing window in the interface of the video call; and in response to an information sharing instruction, displaying to-be-shared information corresponding to the information sharing instruction in the sharing window, the information displayed in the sharing window being configured to be shared between the local terminal and the remote terminal.

In some implementations, the information sharing instruction is an instruction generated by performing a first preset operation on a file in the local terminal or the remote terminal; and the to-be-shared information includes a file corresponding to the first preset operation.

In some implementations, the information sharing instruction includes: a first sharing instruction and a second sharing instruction, the first sharing instruction is an instruction generated by performing a second preset operation on a preset human model diagram in the local terminal or the remote terminal, and the second sharing instruction is an instruction generated by performing a third preset operation on the shopping interface; and the, in response to an information sharing instruction, displaying to-be-shared information corresponding to the information sharing instruction in the sharing window specifically includes:

in response to the first sharing instruction, displaying a preset human model diagram corresponding to the first sharing instruction in the sharing window; and in response to the second sharing instruction, synthesizing a three-dimensional model diagram of a commodity corresponding to the second sharing instruction and the preset human model diagram in the sharing window to generate a second synthesized model diagram, and displaying the second synthesized model diagram in the sharing window.

In some implementations, the interface of the video call includes: a local video window and a remote video window; and the information interaction method further includes:

in the process of the video call, in response to a third interaction instruction, performing split-screen display on the display screen to form at least a third split screen and a fourth split screen; where the third split screen is configured to display the local video window, and the fourth split screen is configured to display the remote video window;

in response to an acquisition instruction, acquiring an image of a target object from images displayed in the remote video window; and synthesizing the image of the target object and an image in the local video window, and performing video transmission with the remote terminal based on the synthesized image.

In some implementations, the acquisition instruction is an instruction generated according to a second sliding operation on the display screen; and the synthesizing the image of the target object and an image in the local video window specifically includes:

according to a moving path of the second sliding operation, determining a target placement position of the image of the target object in the image in the local video window; and according to the target placement position, synthesizing the image of the target object and the image in the local video window.

In some implementations, the, according to the target placement position, synthesizing the image of the target object and the image in the local video window specifically includes:

when a definition adjustment instruction is received, performing definition enhancement processing on the image of the target object to obtain a first image, and performing definition reduction processing on the image in the local video window to obtain a second image; and covering the first image on a target placement position of the second image according to the target placement position.

In some implementations, the performing video transmission with the remote terminal based on the synthesized image specifically includes:

in response to a privacy transmission instruction, displaying the synthesized image in the third split screen, performing image processing on the synthesized image, and sending the processed image to the remote terminal or the server.

In some implementations, after determining the target placement position of the image of the target object in the image in the local video window, the method further includes:

performing image recognition on the image in the local video window, and acquiring a size of an accommodating space at the target placement position, where the accommodating space is a space for placing the target object; and determining whether the target object matches the accommodating space according to a size of the target object and the size of the accommodating space; and if the target object does not match the accommodating space, a recommendation message or a reminding message is generated.

In a second aspect, the present disclosure further provides a computer-readable storage medium, storing a computer program thereon, the computer program, when executed by a processor, implements the above information interaction method.

In a third aspect, the present disclosure further provides a communication terminal, including:

a memory storing a computer program thereon and a processor, where the computer program, when executed by the processor, implements the above information interaction method.

BRIEF DESCRIPTION OF DRAWINGS

The drawings are used to provide further understanding of the present disclosure, constitute a part of specification, explain the present disclosure with the following specific embodiments, but do not constitute limitation on the present disclosure. In the drawings.

DETAIL DESCRIPTION OF EMBODIMENTS

The specific embodiments of the present disclosure are described in detail below with reference to the drawings. It should be understood that the specific embodiments described herein are only used to illustrate and explain the present disclosure, and are not intended to limit the present disclosure.

Figure 1:
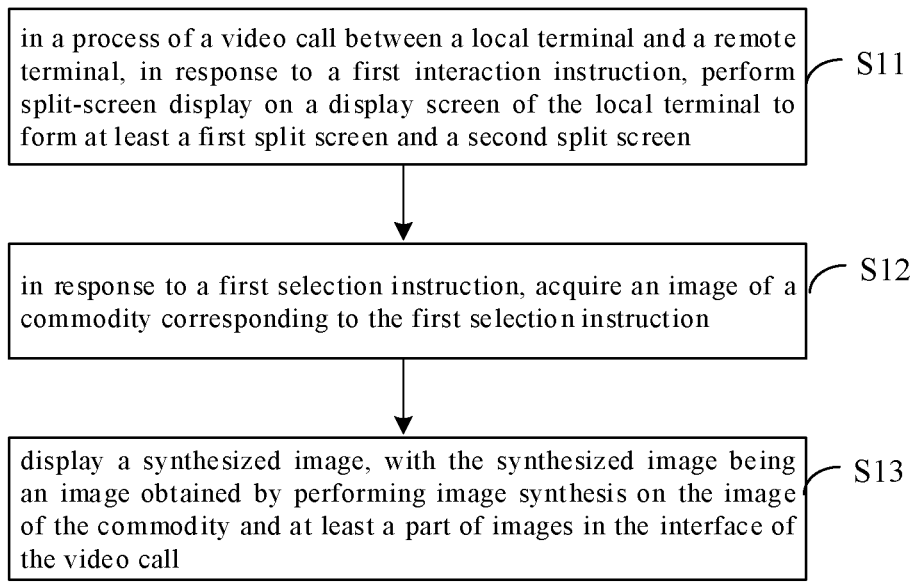
FIG. 1 is a schematic diagram illustrating an information interaction method according to the present disclosure.

An embodiment of the present disclosure provides an information interaction method, and the information interaction method is applied to a local terminal, which may communicate with at least one remote terminal. FIG. 1 is a schematic diagram illustrating an information interaction method according to the present disclosure. As shown in FIG. 1, the information interaction method includes the following steps S11 to S13.

In S11, in a process of a video call between a local terminal and a remote terminal, in response to a first interaction instruction, a display screen of the local terminal is subjected to split-screen display to form at least a first split screen and a second split screen. The first split screen is configured to display an interface of the video call, and the second split screen is configured to display a shopping interface of an online shopping application.

In S12, in response to a first selection instruction, an image of a commodity corresponding to the first selection instruction is acquired; and the first selection instruction is an instruction of selecting the commodity from the shopping interface. For example, the first selection instruction is an instruction that is generated by touching the commodity displayed in the shopping interface by a user; and for another example, the first selection instruction is an instruction that is generated by dragging the commodity displayed in the shopping interface by a user.

In S13, a synthesized image is displayed, and the synthesized image is an image obtained by performing image synthesis on the image of the commodity and at least a part of images in the interface of the video call. The local terminal may synthesize the image of the commodity and at least a part of images in the interface of the video call and send the synthesized image to a server, and the server sends the synthesized image to the remote terminal; or the local terminal may send the image of the commodity and at least a part of images in the interface of the video call to the server, and the server synthesizes the images and then sends the synthesized image to the local terminal and the remote terminal.

In the embodiment of the present disclosure, information interaction may occur between the video call and the online shopping application. When receiving a first selection instruction, the local terminal synthesizes an image of a corresponding commodity and an image in the interface of the video call, and the local terminal may display the synthesized image, so that a local user can see the synthesized image in the process of the video call, thereby improving user experience.

In addition, the synthesized image may be sent to the remote terminal besides that the synthesized image is displayed in the local terminal, so that the other side user or multi-side users in the video call can see the content of the synthesized image at the same time, which is beneficial to providing a shopping suggestion for a user of the local terminal by a user of the remote terminal. For example, the images displayed in the interface of the video call include images collected by the local terminal and images collected by the remote terminal, specifically, the image collected by the local terminal includes a human image, and the image collected by the remote terminal includes a human image. The commodity corresponding to the first selection instruction may be a piece of clothes, a cap, an ornament or the like. The image of the commodity and the human image are synthesized, presenting a try-on effect; and after the user at the remote terminal sees the try-on effect of the commodity, a shopping suggestion may be given, thereby improving online shopping experience and enhancing interactivity.

Figure 2:
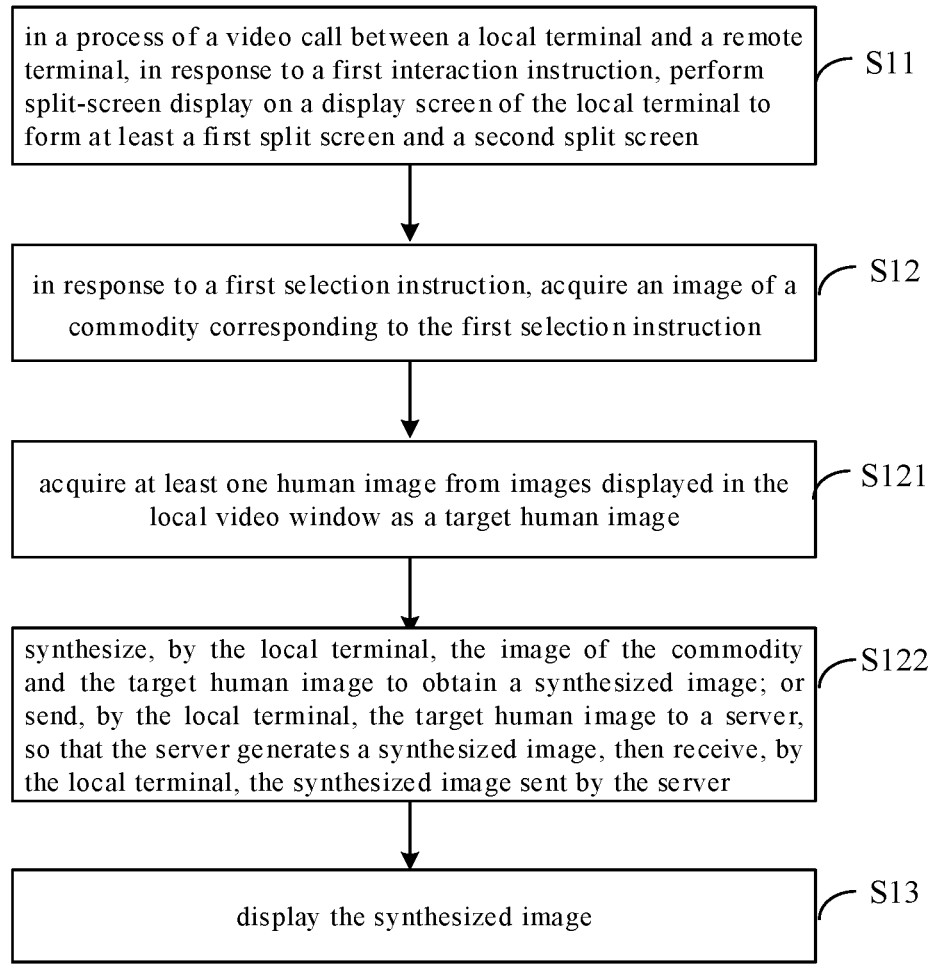
FIG. 2 is a schematic diagram illustrating an information interaction method according to the present disclosure.

FIG. 2 is a schematic diagram illustrating an information interaction method according to the present disclosure. As shown in FIG. 2, the information interaction method includes the following steps S11 to S13.

In S11, in a process of a video call between a local terminal and a remote terminal, in response to a first interaction instruction, a display screen of the local terminal is subjected to split-screen display to form at least a first split screen and a second split screen. The first split screen is configured to display an interface of the video call, and the second split screen is configured to display a shopping interface of an online shopping application. The interface of the video call includes a local video window and a remote video window, the local video window is configured to display images collected by the local terminal in real time, and the remote video window is configured to display images collected by the remote terminal in real time.

In S12, in response to a first selection instruction, an image of a commodity corresponding to the first selection instruction is acquired; and the first selection instruction is an instruction of selecting the commodity from the shopping interface.

In an example, the first selection instruction is an instruction generated according to a click operation applied onto the shopping interface; and the click operation includes: an operation of clicking the shopping interface through touch, or an operation of clicking the shopping interface through at least one of an air gesture, a voice instruction, a facial action or a facial expression. In another example, the first selection instruction is an instruction generated according to a first sliding operation applied onto the shopping interface; and the first sliding operation includes: an air gesture operation of moving from the shopping interface to the interface of the video call, or a touch operation of moving from the shopping interface to the interface of the video call. The term of "touch" herein refers to an action having direct contact with the display screen.

In S121, at least one human image is acquired from images displayed in the local video window and is taken as a target human image.

In some implementations, when the first selection instruction is an instruction generated according to the click operation, step S121 specifically includes: detecting the number of human images in the local video window, and taking the human image as the target human image when only one human image exists in the local video window; when a plurality of human images exist in the local video window, outputting an object selection request to remind a user of the local terminal to input object selection information; and when the object selection information input by the user is received, determining the target human image according to the object selection information.

For example, the object selection request is a text message or a voice message, which is configured to remind the user to input the object selection information. The object selection information may be directly input by clicking the display screen, for example, the user clicks a certain human image in the local video window, and the clicked human image is taken as the target human image.

The number of human images may be determined by face recognition.

When the first selection instruction is an instruction generated according to the first sliding operation, step S121 specifically includes: determining the target human image according to a path of the first sliding operation on the display screen.

The path of the first sliding operation is from a position of a certain commodity icon in the shopping interface to a position in the local video window. The determining the target human image according to a path of the first sliding operation on the display screen may specifically include: determining the target human image according to an end point position of the first sliding operation.

In an example, if the end point position of the first sliding operation falls on one human image in the local video window, the human image is taken as the target human image. In another example, at least one human image and a background image are displayed in the local video window, and if the end point position of the first sliding operation falls on the background image in the local video window, each human image in the local video window is taken as the target human image.

In some implementations, in the process of the video call, the number of human images in the local video window may be detected in real time, and when a plurality of human images exist in the local video window, the local video window is divided into a plurality of local video sub-windows, and each local video sub-window displays one of the human images. In this case, when the first sliding operation is received on the display screen, if the end point position of the first sliding operation falls in a certain local video sub-window, the human image in the local video sub-window is taken as the target human image.

In S122, the local terminal synthesizes the image of the commodity and the target human image to obtain a synthesized image; or the local terminal sends the target human image to a server, so that the server synthesizes the image of the commodity and the target human image to generate a synthesized image.

In some implementations, synthesizing the image of the commodity and the target human image may specifically include: performing image recognition on the human image to determine a human posture, adjusting the image of the commodity according to the human posture, and covering the adjusted image of the commodity on a corresponding position of the human image. Exemplarily, a target coverage area of the image of the commodity on the human image is determined according to an attribute of the commodity, specifically, the attribute of the commodity refers to a type of the commodity (e.g., jackets, trousers, dresses, glasses, hats, etc.). For example, when the commodity is a jacket, the image of the commodity is adjusted according to the human posture, and the adjusted image of the commodity is covered on an upper half of the human image; and when the commodity is a hat, the image of the hat is covered on the top of the human image.

In S13, the synthesized image is displayed.

When the synthesized image in step S122 is synthesized by the local terminal, the synthesized image may be sent to the remote terminal after the synthesized image is generated in the local terminal; or the synthesized image is sent to the server, the server sends the synthesized image to the remote terminal, so that a user of the remote terminal can see the synthesized image. The local terminal may send the synthesized image to the server or the remote terminal while the synthesized image is displayed; and the local terminal may send the synthesized image to the server or the remote terminal before the synthesized image is displayed or after the synthesized image is displayed.

In some implementations, after step S122, the method further includes: adjusting sizes of the local video window and the remote video window by the local terminal; or, in response to a window adjustment instruction sent by the server, adjusting the sizes of the local video window and the remote video window by the local terminal. Exemplarily, before step S122, the local video window is embedded in the remote video window, and after step S122, the remote video window is exchanged with the local video window in size, such that the remote video window is embedded in the local video window; or the local video window and the remote video window are displayed side by side.

It should be noted that, in the process of the video call, a video may be displayed in the local video window and the remote video window, the video in each window includes a plurality of video frames, and each video frame may include at least one human image. When the local terminal receives the first selection instruction, the image of the commodity may be respectively synthesized with a plurality of continuous human images so as to form a video. For example, if the commodity is a jacket, after the user inputs the first selection instruction, a video of trying on the corresponding jacket by users may be displayed in the local video window of the local terminal, and accordingly, the user of the remote terminal will see the video of trying on the jacket by users.

Figure 3:
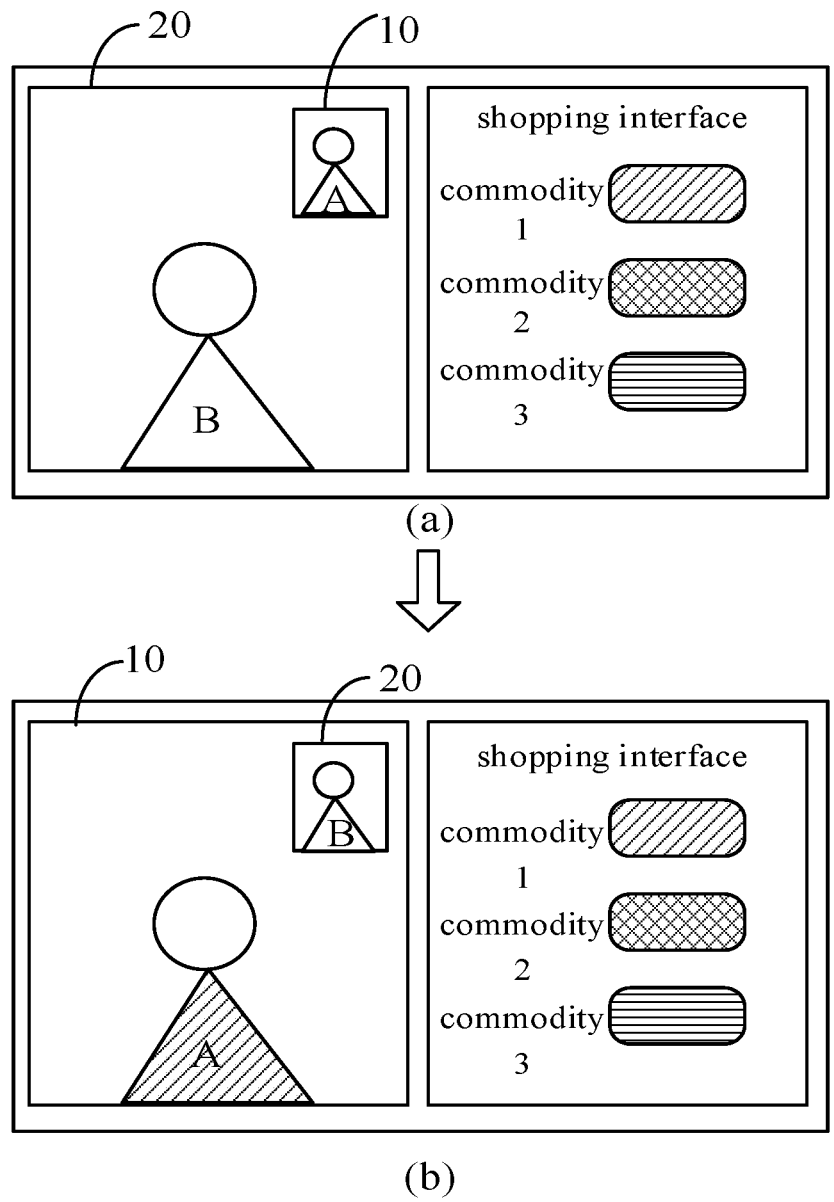
FIG. 3 is a schematic diagram illustrating a change in a picture of a display screen of a local terminal in one scene.

FIG. 3 is a schematic diagram illustrating a change in a picture of a display screen of a local terminal in one scene, and FIG. 3 shows a case where only one human image exists in each of the local video window and the remote video window. As shown in FIG. 3(a), in an initial state, a local video window 10 is embedded in a remote video window 20, a human image A is displayed in the local video window 10, and a human image B is displayed in the remote video window 20; and when a user performs an touch operation on a shopping interface and a touch position of the touch operation is a position of a commodity 1, an image of the commodity 1 and the human image A in the local video window are synthesized, and sizes of the local video window 10 and the remote video window 20 are adjusted, as shown in FIG. 3(b).

Figure 4:
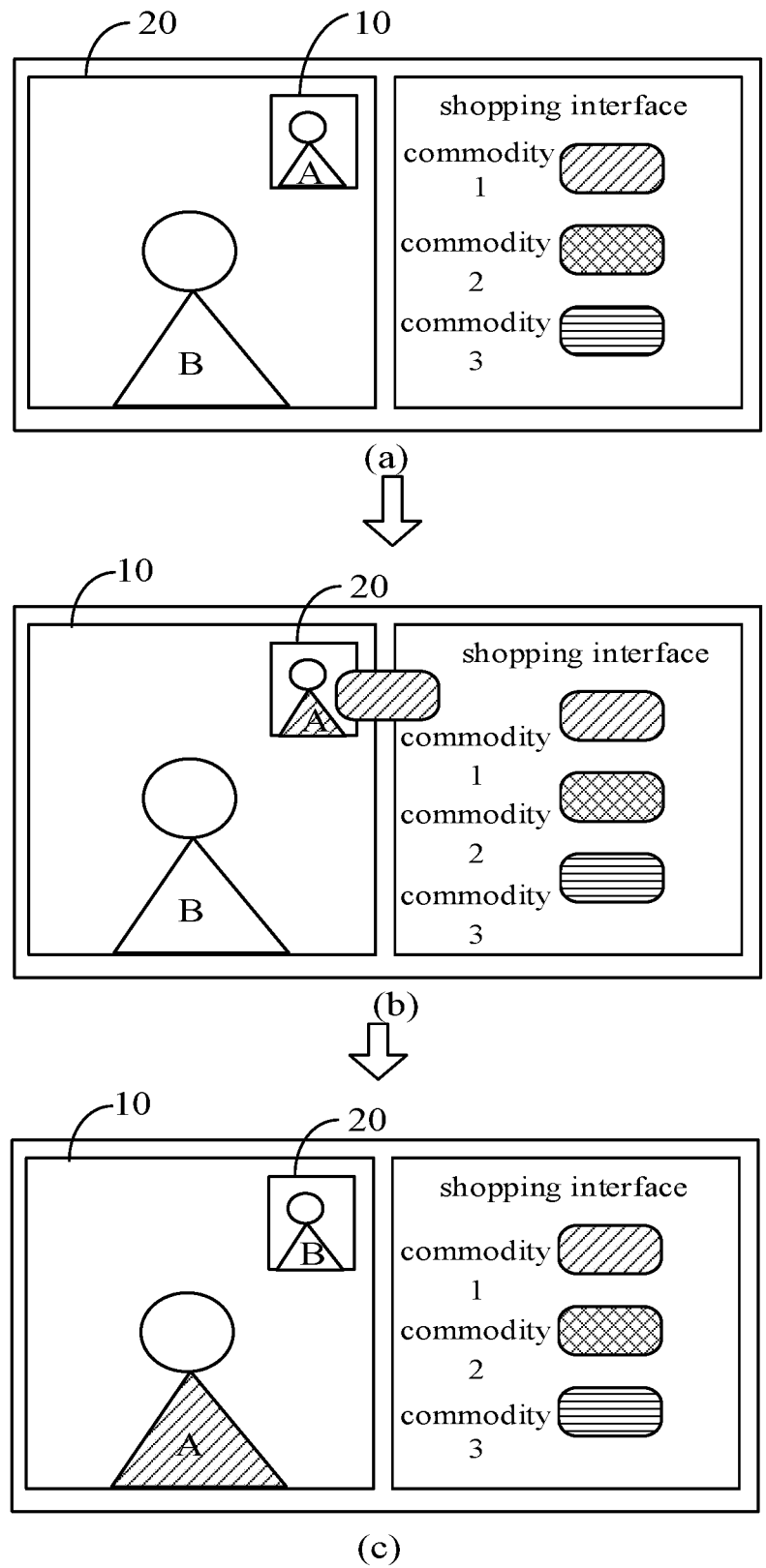
FIG. 4 is a schematic diagram illustrating a change in a picture of a display screen of a local terminal in another scene.

FIG. 4 is a schematic diagram illustrating a change in a picture of a display screen of a local terminal in another scene, and FIG. 4 shows a case where only one human image exists in each of the local video window and the remote video window. As shown in FIG. 4(a), in an initial state, a local video window 10 is embedded in a remote video window 20; and when a user performs a first dragging operation on a shopping interface (e.g., clicking a commodity 1, and dragging the commodity 1 into the local video window 10), an image of the commodity 1 and the human image A in the local video window 10 are synthesized, as shown in FIG. 4(b). Moreover, as shown in FIG. 4(c), sizes of the local video window 10 and the remote video window 20 are adjusted.

In some implementations, when the synthesized image of the human image in the local video window and the image of the commodity is transmitted to the remote terminal, the user of the remote terminal may give an evaluation and suggestion for the commodity, and in such case, the user of the local terminal may reselect a commodity (e.g., selecting a commodity with another color or size) in the shopping interface according to the evaluation and suggestion, so that an image of a new commodity and the human image in the local video window are synthesized.

In some implementations, in step S12, while the image of the commodity is acquired in response to the first selection instruction, link information of the commodity corresponding to the first selection instruction may also be acquired, and the link information is, for example, a website or a two-dimensional code for purchasing the commodity. In step S122, while the local terminal synthesizes the image of the commodity and the target human image in the local video window, or while the local terminal sends the target human image to the server, the link information of the commodity may be displayed in the local video window and is sent to the remote terminal, or the link information may be sent to the server, so that the server sends the link information to the remote terminal. In this way, if a user of the remote terminal is interested in the commodity, the user may directly purchase the corresponding commodity according to the link information.

Figure 5:
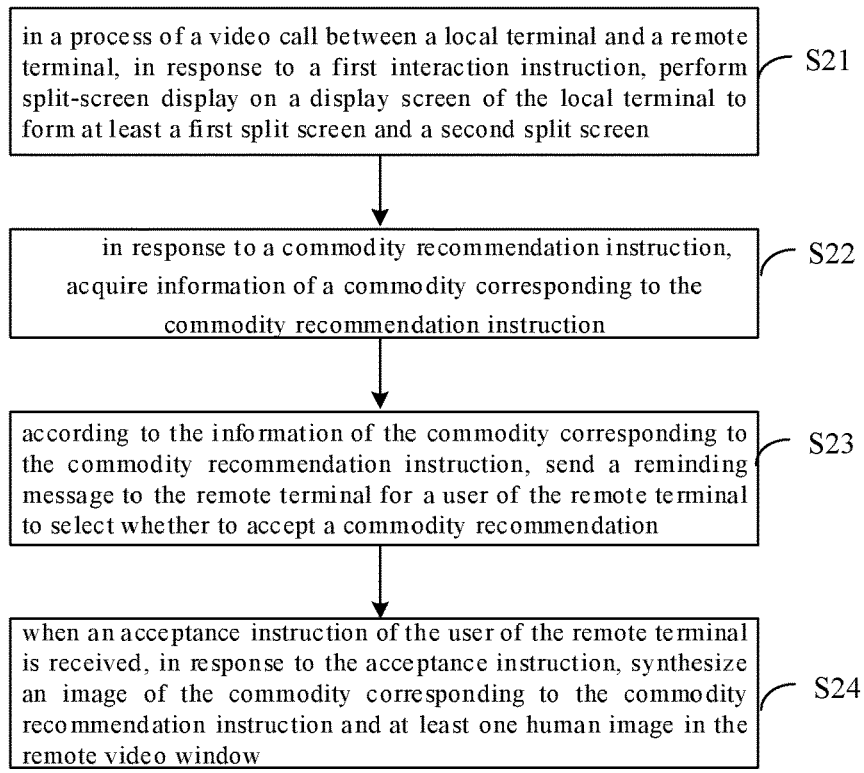
FIG. 5 is a schematic diagram illustrating an information interaction method according to the present disclosure.

FIG. 5 is a schematic diagram illustrating an information interaction method according to the present disclosure. As shown in FIG. 5, the information interaction method includes the following steps S21 to S24.

In S21, in a process of a video call with a remote terminal, in response to a first interaction instruction, a display screen of a local terminal is subjected to split-screen display to form at least a first split screen and a second split screen. The first split screen is configured to display an interface of the video call, and the second split screen is configured to display a shopping interface.

In S22, in response to a commodity recommendation instruction, information of a commodity corresponding to the commodity recommendation instruction is acquired.

In some implementations, the commodity recommendation instruction is an instruction generated by a dragging operation of clicking a commodity in the shopping interface and dragging the commodity into a remote video window.

In S23, according to the information of the commodity corresponding to the commodity recommendation instruction, a reminding message is sent to the remote terminal for a user of the remote terminal to select whether to accept a commodity recommendation.

In some implementations, when a user of the local terminal clicks a commodity in the shopping interface and drags the commodity into the remote video window, a reminding message is generated and is sent to the remote terminal, so that the remote terminal outputs the reminding message. The reminding message is configured to remind the user of the remote terminal, and a content of the reminding message may include: the information of the commodity corresponding to the commodity recommendation instruction, and an inquiry whether the remote terminal accepts the commodity recommendation. The reminding message may be a text message, such as "the other side user recommends a commodity XXX to you, do you try on it".

In S24, when an acceptance instruction of the user of the remote terminal is received, in response to the acceptance instruction, an image of the commodity corresponding to the commodity recommendation instruction and at least one human image in the remote video window are synthesized. The acceptance instruction is configured to indicate that the user of the remote terminal accepts the commodity corresponding to the commodity recommendation instruction.

In some implementations, in step S24, after the image of the commodity and the at least one human image in the remote video window are synthesized, the synthesized image may be displayed in the remote video window of the local terminal, and in addition, the synthesized image is directly sent to the remote terminal for display; or the synthesized image is sent to a server for the server to send the synthesized image to the remote terminal for display.

When a plurality of human images exist in the remote video window, a target human image in the remote video window may be determined according to an end point position of the dragging operation corresponding to the commodity recommendation instruction; and when an acceptance instruction of the user of the remote terminal is received, the commodity recommendation instruction together with the corresponding image of the commodity and the target human image in the remote video window are synthesized.

In the embodiment, after the image of the commodity and the human image in the local video window are synthesized, and after the image of the commodity and the human image in the remote video window are synthesized, these synthesized images may be saved. For example, during a recent period of time (e.g., within a week), each time a first selection instruction input by the local user is received, a generated synthesized image is saved; and each time an acceptance instruction sent by the remote terminal is received, a generated synthesized image is saved. For another example, synthesized images generated by a certain number of times of the first selection instructions and synthesized images generated by a certain number of times of the acceptance instructions may be saved. As described above, when the first selection instruction is received, and the image of the commodity is synthesized with human images in a plurality of continuous frames of images, one synthesized image may be saved each time the first selection instruction is received. Similarly, one synthesized image may be saved each time the acceptance instruction sent by the remote terminal is received.

Figure 6:
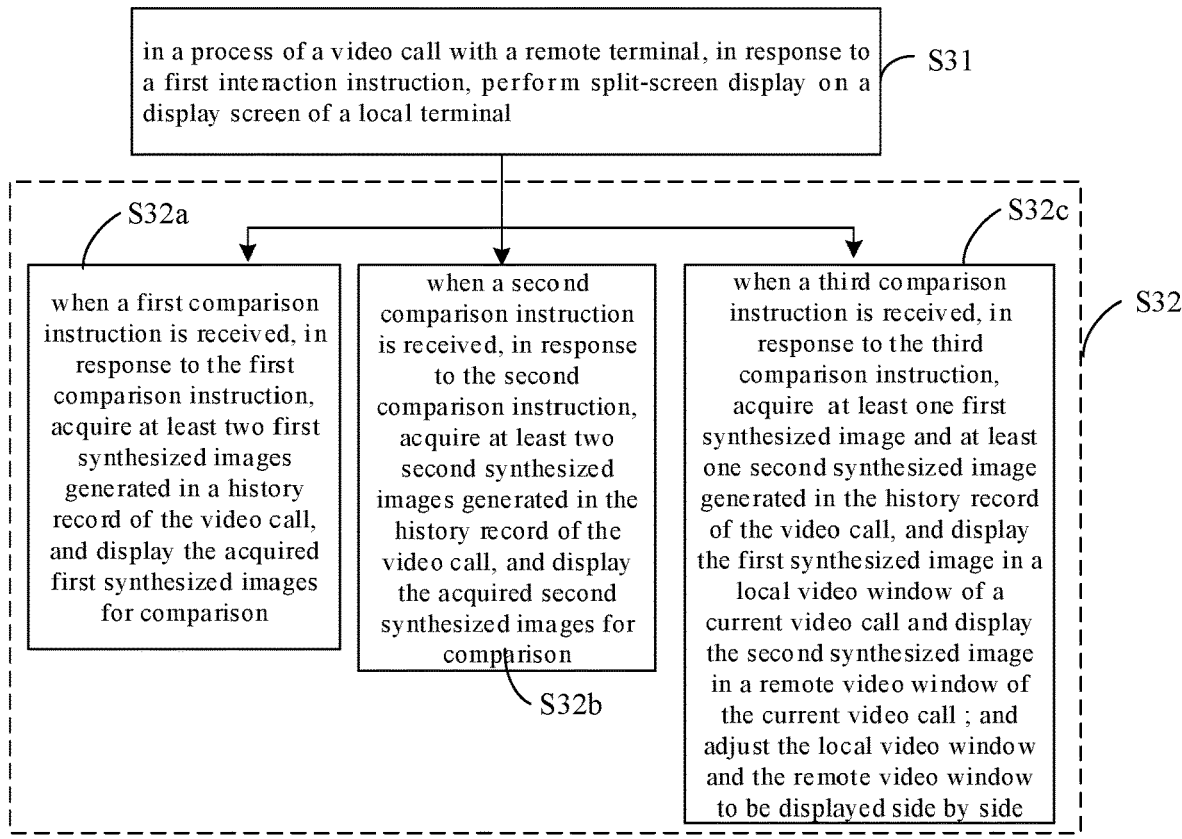
FIG. 6 is a schematic diagram illustrating an information interaction method according to the present disclosure.

FIG. 6 is a schematic diagram illustrating an information interaction method according to the present disclosure. As shown in FIG. 6, the information interaction method includes the following steps S31 and S32.

In S31, in a process of a video call with a remote terminal, in response to a first interaction instruction, a display screen of a local terminal is subjected to split-screen display to form at least a first split screen and a second split screen. The first split screen is configured to display an interface of the video call, and the second split screen is configured to display a shopping interface.

In S32, in response to a comparison instruction, at least two synthesized images generated in a history record of the video call are acquired, and the at least two synthesized images are displayed for comparison.

The at least two synthesized images include at least two first synthesized images, or at least two second synthesized images, or at least one first synthesized image and at least one second synthesized image. The first synthesized image is a synthesized image of a human image in a local video window and an image of a commodity, and the second synthesized image is a synthesized image of a human image in a remote video window and an image of a commodity.

In some implementations, the comparison instruction includes a first comparison instruction, a second comparison instruction and a third comparison instruction. The first comparison instruction is configured to indicate to display at least two first synthesized images for comparison; the second comparison instruction is configured to indicate to display at least two second synthesized images for comparison; and the third comparison instruction is configured to indicate to display at least one first synthesized image and at least one second synthesized image for comparison. Each of the first comparison instruction, the second comparison instruction and the third comparison instruction may be an instruction input to the local terminal by a user.

Step S32 may specifically include at least one of the following steps S32a, S32b or S32c.

In S32a, when a first comparison instruction is received, in response to the first comparison instruction, at least two first synthesized images generated in a history record of the video call are acquired, and the acquired first synthesized images are displayed for comparison. It should be understood that the acquired at least two first synthesized images are generated based on first selection instructions at different times.

Figure 7:
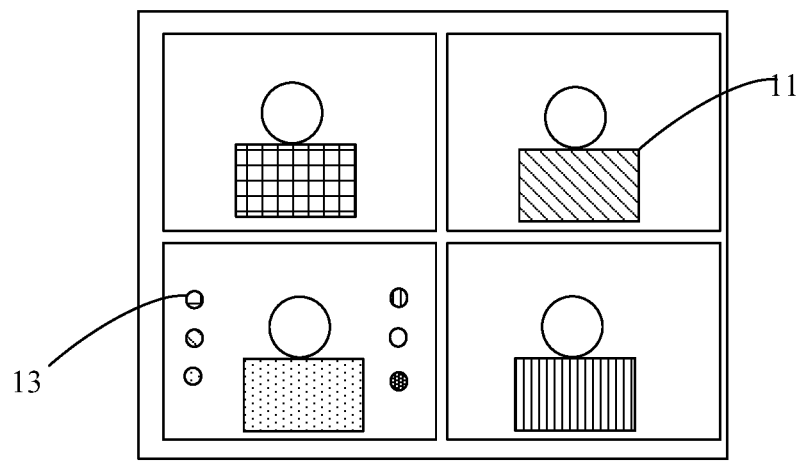
FIG. 7 is a schematic diagram illustrating a plurality of first synthesized images subjected to comparison according to the present disclosure.

FIG. 7 is a schematic diagram illustrating a plurality of first synthesized images subjected to comparison according to the present disclosure. As shown in FIG. 7, when a first comparison instruction is received, a plurality of first synthesized images 11 may be displayed on a display screen, and in this case, a shopping interface may not to be displayed. In addition, a thumbnail image or a mark 13 of a commodity corresponding to the first selection instruction in the history record may be displayed, and in this way, a corresponding first synthesized image 11 may be displayed by a user clicking the thumbnail image or the mark of the commodity.

In S32b, when a second comparison instruction is received, in response to the second comparison instruction, at least two second synthesized images generated in the history record of the video call are acquired, and the acquired second synthesized images are displayed for comparison. It should be understood that the acquired at least two second synthesized images are generated based on acceptance instructions at different times.

In S32c, when a third comparison instruction is received, in response to the third comparison instruction, at least one first synthesized image and at least one second synthesized image generated in the history record of the video call are acquired, and the first synthesized image is displayed in a local video window of a current video call and the second synthesized image is displayed in a remote video window of the current video call; and the local video window and the remote video window are adjusted to be displayed side by side. The images displayed in the local video window and the remote video window may be transmitted to the remote terminal, so that a user of the local terminal and a user of the remote terminal can see a result of comparison.

Figure 8:
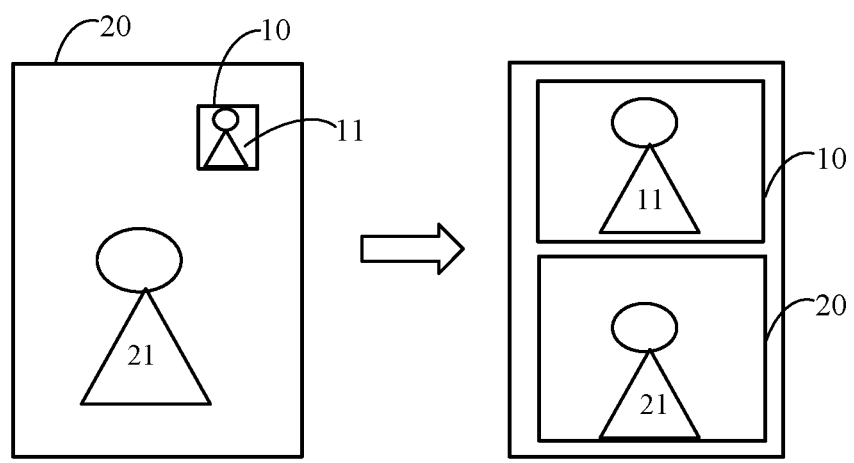
FIG. 8 is a schematic diagram illustrating a change in an interface of a video call when a second comparison instruction is received according to the present disclosure.

FIG. 8 is a schematic diagram illustrating a change in an interface of a video call when a second comparison instruction is received according to the present disclosure. As shown in FIG. 8, in a process of a video call, a local video window 10 is embedded in a remote video window 20; and when a second comparison instruction is received in the process of the video call, a first synthesized image 11 is displayed in the local video window 10 of the interface of the current video call, a second synthesized image 21 is displayed in the remote video window 20 of the interface of the current video call, and the local video window 10 and the remote video window 20 are adjusted to be displayed side by side.

Figure 9:
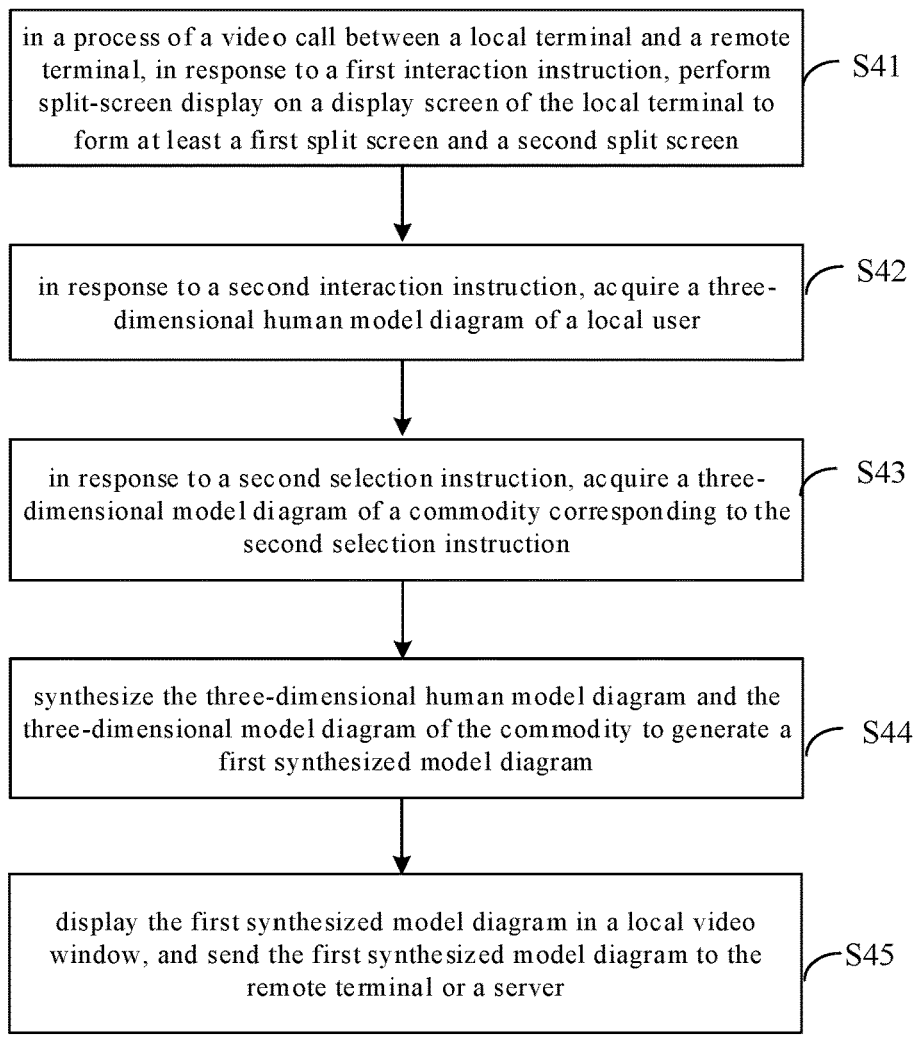
FIG. 9 is a schematic diagram illustrating an information interaction method according to the present disclosure.

FIG. 9 is a schematic diagram illustrating an information interaction method according to the present disclosure. As shown in FIG. 9, the information interaction method includes the following steps S41 to S45.

In S41, in a process of a video call with a remote terminal, in response to a first interaction instruction, a display screen of a local terminal is subjected to split-screen display to form at least a first split screen and a second split screen. The first split screen is configured to display an interface of the video call, and the second split screen is configured to display a shopping interface.

In S42, in response to a second interaction instruction, a three-dimensional human model diagram of a local user is acquired.

The three-dimensional human model diagram may be a three-dimensional human model diagram that is pre-stored in the local terminal, or may be acquired in a mode of image acquisition by a camera. For example, when a second interaction instruction is received, a reminding message is sent to remind a user to stand at a specified position and turn his or her body, image acquisition is carried out by a camera, and the three-dimensional human model diagram of the user is obtained through three-dimensional modeling.

In S43, in response to a second selection instruction, a three-dimensional model diagram of a commodity corresponding to the second selection instruction is acquired.

The second selection instruction is an instruction for selecting a commodity in the shopping interface, for example, when a second selection instruction is detected, a plurality of perspective views of a corresponding commodity are acquired, and a three-dimensional model diagram of the commodity is acquired according to the plurality of perspective views of the commodity.

In S44, the three-dimensional human model diagram and the three-dimensional model diagram of the commodity are synthesized to generate a first synthesized model diagram.

In S45, the first synthesized model diagram is displayed in a local video window, and is sent to the remote terminal or a server. The first synthesized model diagram may be directly sent to the remote terminal by the local terminal; or the first synthesized model diagram is sent to the server by the local terminal and then is sent to the remote terminal by the server. Certainly, the local terminal may send the three-dimensional human model diagram and the three-dimensional model diagram of the commodity to the server, and the server generates the first synthesized model diagram and then sends the first synthesized model diagram to the local terminal and the remote terminal.

For example, when the commodity is a piece of clothes, the generated first synthesized model diagram is a three-dimensional model diagram of trying on the piece of clothes by the user, so that the user of the local terminal and the user of the remote terminal can see a more vivid try-on effect.

Figure 10:
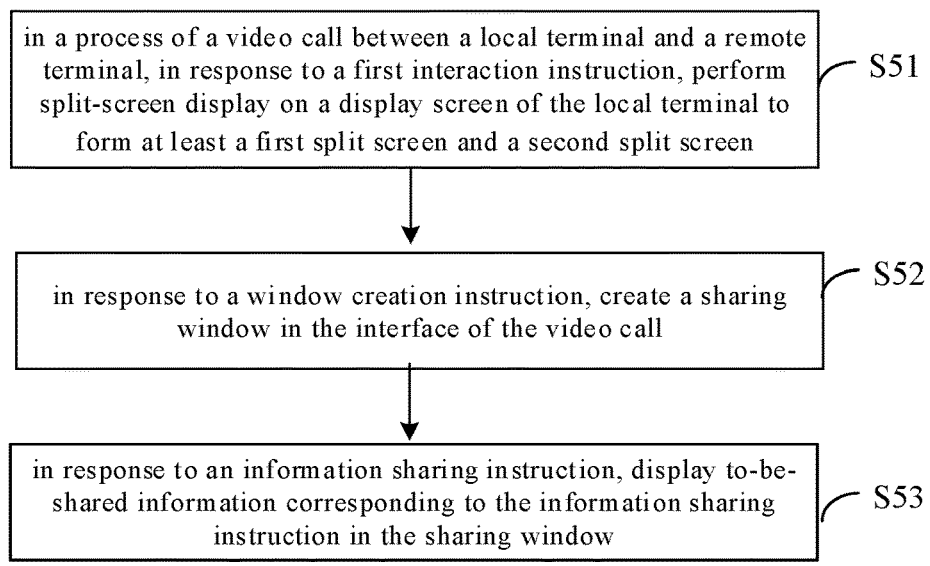
FIG. 10 is a schematic diagram illustrating an information interaction method according to the present disclosure.

FIG. 10 is a schematic diagram illustrating an information interaction method according to the present disclosure. As shown in FIG. 10, the information interaction method includes the following steps S51 to S53.

In S51, in a process of a video call with a remote terminal, in response to a first interaction instruction, a display screen of a local terminal is subjected to split-screen display to form at least a first split screen and a second split screen. The first split screen is configured to display an interface of the video call, and the second split screen is configured to display a shopping interface.

The interface of the video call includes: a local video window and a remote video window.

In S52, in response to a window creation instruction, a sharing window is created in the interface of the video call.

Figure 11A:
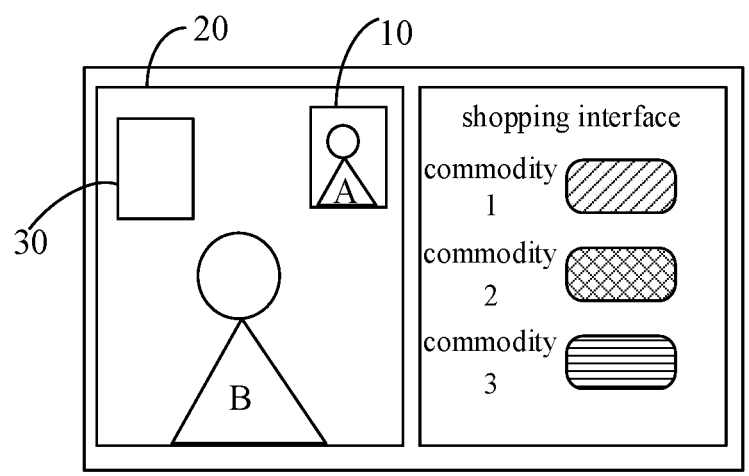
FIG. 11A is a schematic diagram of a sharing window in an interface of a local terminal according to the present disclosure.
Figure 11B:
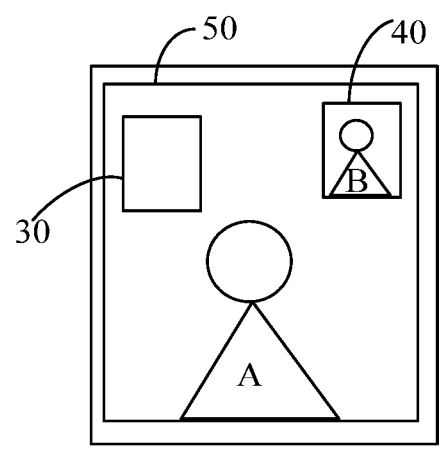
FIG. 11B is a schematic diagram of a sharing window in an interface of a remote terminal according to the present disclosure.

FIG. 11A is a schematic diagram of a sharing window in an interface of a local terminal according to the present disclosure, and FIG. 11B is a schematic diagram of a sharing window in an interface of a remote terminal according to the present disclosure. As shown in FIG. 11A, an interface of a video call and a shopping interface are displayed on a display screen of the local terminal, the interface of the video call includes a local video window 10 and a remote video window 20, a human image A is displayed in the local video window 10, and a human image B is displayed in the remote video window 20. As shown in FIG. 11B, a local video window 40 and a remote video window 50 are displayed in an interface of a video call of a remote terminal, a human image B is displayed in the local video window 40, and a human image A is displayed in the remote video window 50. When the local terminal receives the window creation instruction, a sharing window 30 may be created in the interface of the video call of the local terminal, a corresponding instruction may be sent to a server, and then the server sends the corresponding instruction to the remote terminal, so that the sharing window 30 is created in the interface of the video call of the remote terminal.

In S53, in response to an information sharing instruction, to-be-shared information corresponding to the information sharing instruction is displayed in the sharing window. The information in the sharing window is configured to be shared between the local terminal and the remote terminal. That is, the to-be-shared information is displayed in a sharing window of the local terminal and in a sharing window of the remote terminal.

In an example, the information sharing instruction is an instruction generated by performing a first preset operation on a file in the local terminal or the remote terminal; and the to-be-shared information includes a file corresponding to the first preset operation. The file is, for example, a picture file, a document file, a web page file, a video file, a music file, or the like.

For example, the first preset operation is a dragging operation. Besides the first split screen and the second split screen, the interface of the display screen of the local terminal may further include an edge area in which an icon of a to-be-shared file may be displayed. When a local user drags the icon of the to-be-shared file into the sharing window, the local terminal sends the file to the server, and the server sends the file to the remote terminal. Similarly, when the user of the remote terminal drags the icon of the to-be-shared file into the sharing window, the remote terminal may also send the file to the server, and then the server sends the file to the local terminal.

In another example, the information sharing instruction includes a first sharing instruction and a second sharing instruction. The first sharing instruction is an instruction generated by performing a second preset operation on a preset human model diagram in the local terminal or the remote terminal. For example, the second preset operation is: dragging the preset human model diagram in the local terminal or the remote terminal into the sharing window. The second sharing instruction is an instruction generated by performing a third preset operation on the shopping interface, for example, the third preset operation is: dragging a commodity on the shopping interface into the sharing window.

In this case, step S53 specifically includes the following steps S531 and S532.

In S531, when a first sharing instruction is received, in response to the first sharing instruction, a preset human model diagram corresponding to the first sharing instruction is displayed in the sharing window.

In S532, when a second sharing instruction is received, in response to the second sharing instruction, a three-dimensional model diagram of a commodity corresponding to the second sharing instruction and a preset human model diagram in the sharing window are synthesized to generate a second synthesized model diagram, and the second synthesized model diagram is sent to the sharing window.

The preset human model diagram may be a three-dimensional human model diagram of a third-side user, which is pre-stored in the local terminal, and the third-side user is a user except the user of the local terminal and the user of the remote terminal. When the commodity is a piece of clothes, the third-side user may realize online clothes selection through step S53.

Figure 12:
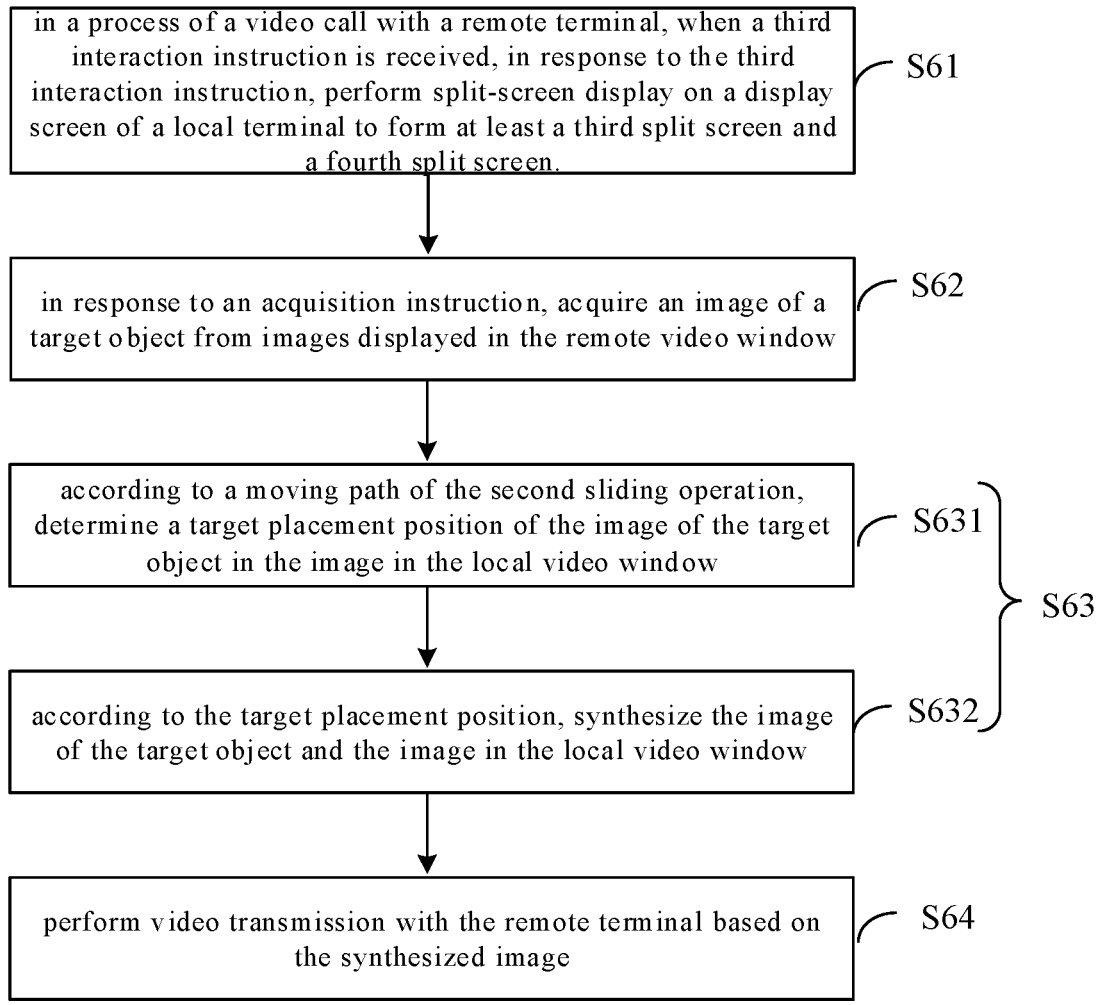
FIG. 12 is a schematic diagram illustrating an information interaction method according to the present disclosure.

FIG. 12 is a schematic diagram illustrating an information interaction method according to the present disclosure. As shown in FIG. 12, the information interaction method is performed in a process of a video call, and an interface of the video call includes a local video window and a remote video window. The information interaction method includes the following steps S61 to S64.

In S61, in a process of a video call with a remote terminal, when a third interaction instruction is received, in response to the third interaction instruction, a display screen of a local terminal is subjected to split-screen display to form at least a third split screen and a fourth split screen. The third split screen is configured to display the local video window, and the fourth split screen is configured to display the remote video window.

In S62, in response to an acquisition instruction, an image of a target object is acquired from images displayed in the remote video window.

In an example, the acquisition instruction is an instruction generated according to a second sliding operation on the display screen. For example, an image of at least one object is displayed in the remote video window, and the second sliding operation may specifically include an operation of selecting a certain object by touch or an air gesture and dragging the object into the local video window. The selected object is the target object.

In an example, the images displayed in the remote video window are images collected by the remote terminal in real time, and the images collected by the remote terminal are a photo of an environment where the remote terminal is located, and the photo may include an image of one object or images of a plurality of objects. In another example, the images displayed in the remote video window include an image of the target object, and the image of the target object is a three-dimensional model diagram of the target object, which is acquired by the remote terminal. For example, the remote terminal scans an entity of the target object, and generates a three-dimensional model diagram by means of three-dimensional modeling, and the three-dimensional model diagram is sent to the local terminal and is displayed in a remote video window of the local terminal. For another example, the remote terminal scans a two-dimensional code of the target object and directly acquires the three-dimensional model diagram of the target object through the two-dimensional code.

In S63, the image of the target object and an image in the local video window are synthesized.

Step S63 specifically includes the following steps S631 and S632.

In S631, according to a moving path of the second sliding operation, a target placement position of the image of the target object in the image in the local video window is determined.

In S632, according to the target placement position, the image of the target object and the image in the local video window are synthesized. In an example, step S632 may specifically include: directly covering the image of the target object on a target position of the image in the local video window.

S64, video transmission is performed with the remote terminal based on the synthesized image.

Step S64 specifically includes: displaying the synthesized image in the local video window and sending the synthesized image to the remote terminal or a server, so that a user of the local terminal and a user of the remote terminal can see the synthesized image. The synthesized image may be directly sent to the remote terminal, or the synthesized image may be sent to the server and then is sent to the remote terminal by the server.

Figure 13:
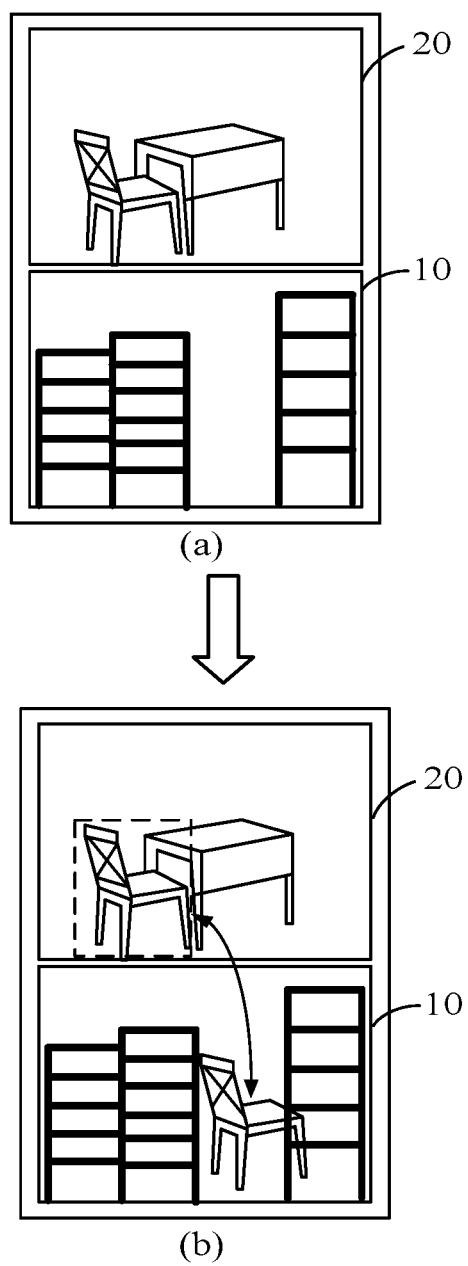
FIG. 13 is a schematic diagram illustrating a change in an interface of a local terminal before and after receiving an acquisition instruction according to the present disclosure.

FIG. 13 is a schematic diagram illustrating a change in an interface of a local terminal before and after receiving an acquisition instruction according to the present disclosure. In an example, a user of a remote terminal is shopping, for example, the user is in a furniture market, and a user of the local terminal is at home, and the local terminal is in a video call with the remote terminal. In such case, as shown in FIG. 13(a), an environment image of the home of the user is displayed in a local video window 10 of the local terminal, and an environment image of the furniture market is displayed in a remote video window 20. When the user of the local terminal sees a piece of favorite furniture from the remote video window 20, as shown in FIG. 13(b), the user selects the furniture and drags the furniture into the local video window 10 (i.e., performing the second sliding operation), the image of the furniture and the environment image of the home of the user are synthesized, so that the user of the local terminal and the user of the remote terminal can see placement of the furniture in the home, thereby facilitating determining whether the furniture matches the environment in the home.

In another example, synthesizing the image of the target object and the image in the local video window according to the target placement position may specifically include: when a definition adjustment instruction is received, performing definition enhancement processing on the image of the target object to obtain a first image, and performing definition reduction processing on the image in the local video window to obtain a second image; and then covering the first image on a target placement position of the second image according to the target placement position.

The definition adjustment instruction may be an instruction input to the local terminal by the user of the local terminal. It should be understood that the higher the definition of the image, the better the perception of human eyes. For example, the definition reduction processing may be blurring processing; and the definition enhancement processing may be denoising and/or deblurring or resolution enhancement processing. By performing definition enhancement processing on the image of the target object and performing definition reduction processing on the image in the local video window, a matching condition of the target object and a surrounding image can be seen by the user of the local terminal and the user of the remote terminal, and a bandwidth may be saved during image transmission.

In some implementations, after step S631 or step S632, the method may further include: performing image recognition on the image in the local video window, and acquiring a size of an accommodating space at the target placement position. The accommodating space is a space for placing the target object. It is determined whether the target object matches the accommodating space according to a size of the target object and the size of the accommodating space; and if the target object does not match the accommodating space, a recommendation message or a reminding message is generated.

Exemplarily, when the size of the accommodating space is acquired, the image in the local video window may be subjected to image recognition, so that a size of an image of the accommodating space in the local video window is acquired, and an actual size of the accommodating space is acquired according to parameters (e.g., a focal length, a zoom size, and the like) of a camera of the local terminal when the camera acquires images. The size of the target object may be acquired by the remote terminal, for example, the target object is a piece of furniture in the furniture market, and the remote terminal may scan a two-dimensional code in the furniture market to acquire at least information of the target object. Specifically, the recommendation message is information of an object that matches the accommodation space and is of the same type as the target object. For example, when the target object does not match the accommodation space, automatic search for an object of the same type as the target object may be performed on a related shopping application to acquire the recommendation message. The reminding message is configured to remind the user that the target object does not match the accommodating space.

For example, an image of a chair is displayed in the remote video window, images of two cabinets are displayed in the local video window, and the user of the local terminal drags the chair into an area between the two cabinets in the local video window; and if the area between the two cabinets is not enough to accommodate the chair, a reminding message is sent. In addition, automatic search for information of other chairs may be performed on the shopping application, and the information of other chairs is recommended to the user.

In some examples, step S64 may include: directly displaying the synthesized image in the local video window, and sending the synthesized image to the remote terminal or the server. In other examples, step S64 may include: in response to a privacy transmission instruction, displaying the synthesized image in the third split screen, performing image processing on the synthesized image, and sending the processed image to the remote terminal or the server. The performing image processing on the synthesized image may specifically include: performing blurring processing or hiding processing on at least a partial area of the synthesized image, for example, the at least partial area is added with mosaic or is covered with a preset picture. In this way, the user of the local terminal can clearly see an effect after the environment in the home and the target object are synthesized, and what is seen by the other side is only a local image or a fuzzy image after being processed.

The present disclosure further provides a computer-readable storage medium having a computer program stored therein, the computer program, when executed by a processor, implements the above information interaction method.

The present disclosure further provides a communication terminal, such as a mobile phone or another terminal capable of performing communication. The communication terminal includes a memory and a processor, and the memory has a computer program stored therein, the computer program, when executed by the processor, implements the above information interaction method.

The above memory and the computer-readable storage medium include, but are not limited to, readable medium such as Random Access Memories (RAMs), Read-Only Memories (ROMs), Non-Volatile Random Access Memories (NVRAMs), Programmable Read-Only Memories (PROMs), Erasable Programmable Read-Only Memories (EPROMs), Electrically Erasable PROMs (EEPROMs), flash Memories, magnetic or optical data memories, registers, magnetic disks or tapes, optical storage medium such as Compact Disks (CD) or DVDs (digital versatile disks), and other non-transitory medium. Examples of the processor include, but are not limited to, general purpose processors, Central Processing Units (CPUs), microprocessors, Digital Signal Processors (DSPs), controllers, microcontrollers, state machines, and the like.

It should be understood that the above embodiments are merely exemplary embodiments that are employed to illustrate the principles of the present disclosure, and that the present disclosure is not limited thereto. Various changes and modifications may be made by those skilled in the art without departing from the spirit and essence of the present disclosure, and should be considered to fall within the protection scope of the present disclosure.

What is claimed is:

1. An information interaction method, applied to a local terminal and comprising:
   in a process of a video call with a remote terminal, in response to a first interaction instruction, performing split-screen display on a display screen of the local terminal to form at least a first split screen and a second split screen, wherein the first split screen is configured to display an interface of the video call, and the second split screen is configured to display a shopping interface;
   in response to a first selection instruction, acquiring an image of a commodity corresponding to the first selection instruction; wherein the first selection instruction is an instruction of selecting the commodity from the shopping interface; and
   displaying a synthesized image, wherein the synthesized image is an image obtained by performing image synthesis on the image of the commodity and at least a part of images in the interface of the video call,
   wherein the interface of the video call comprises: a local video window configured to display images collected by the local terminal and a remote video window configured to display images collected by the remote terminal; and
   before displaying the synthesized image, the method further comprises:
   acquiring at least one human image from images displayed in the local video window as a target human image; and
   synthesizing the image of the commodity and the target human image to obtain the synthesized image; or sending the target human image to a server, and receiving the synthesized image sent by the server, wherein after synthesizing the image of the commodity and the target human image, the method further comprises:
sending the synthesized image to the remote terminal or the server.

2. The information interaction method of claim 1, wherein the first selection instruction is an instruction generated according to a click operation applied onto the shopping interface, or an instruction generated according to a first sliding operation applied onto the shopping interface; the click operation comprises: an operation of clicking the shopping interface through touch, or an operation of clicking the shopping interface through an air gesture;
and the first sliding operation comprises: an air gesture operation of moving from the shopping interface to the interface of the video call, or a touch operation of moving from the shopping interface to the interface of the video call; and
the acquiring at least one human image from images displayed in the local video window as a target human image specifically comprises:
in response to that the first selection instruction is an instruction generated according to the click operation, detecting the number of human images in the local video window, and taking the human image as the target human image in response to that one human image exists in the local video window; in response to that the number of human images in the local video window is greater than 1, outputting an object selection request to remind a user to input object selection information; and
in response to that the object selection information input by the user is received, determining the target human image according to the object selection information; and
in response to that the first selection instruction is an instruction generated according to the first sliding operation, determining the target human image according to a path of the first sliding operation on the display screen.

3. The information interaction method of claim 1, further comprising:
detecting the number of human images in the local video window, and in response to that a plurality of human images exist in the local video window, dividing the local video window into a plurality of local video sub-windows, each local video sub-window displaying one of the human images.

4. The information interaction method of claim 1, further comprising:
in response to the first selection instruction, acquiring link information of the commodity corresponding to the first selection instruction; and
displaying the link information of the commodity in the local video window, and sending the link information to the remote terminal or the server.

5. The information interaction method of claim 1, further comprising:
in response to a commodity recommendation instruction, acquiring information of a commodity corresponding to the commodity recommendation instruction;
according to the information of the commodity corresponding to the commodity recommendation instruction, sending a reminding message to the remote terminal for a user of the remote terminal to select whether to accept a commodity recommendation; and in response to an acceptance instruction of the user of the remote terminal, synthesizing an image of the commodity corresponding to the commodity recommendation instruction and at least one human image in the remote video window.

6. The information interaction method of claim 1, further comprising:
in response to a comparison instruction, acquiring at least two synthesized images generated in a history record of the video call, and displaying the at least two synthesized images for comparison;
wherein
the at least two synthesized images comprise at least two first synthesized images, or at least two second synthesized images, or at least one first synthesized image and at least one second synthesized image; and the first synthesized image is a synthesized image of a human image in the local video window and the image of the commodity, and the second synthesized image is a synthesized image of a human image in the remote video window and the image of the commodity.

7. The information interaction method of claim 6, wherein the, in response to a comparison instruction, acquiring at least two synthesized images generated in a history record of the video call, and displaying the at least two synthesized images for comparison specifically comprises:
in response to a first comparison instruction, acquiring at least two first synthesized images generated in the history record of the video call, and displaying the acquired first synthesized images for comparison;
in response to a second comparison instruction, acquiring at least two second synthesized images generated in the history record of the video call, and displaying the acquired second synthesized images for comparison; and
in response to a third comparison instruction, acquiring at least one first synthesized image and at least one second synthesized image generated in the history record of the video call, and displaying the first synthesized image in a local video window of a current video call and displaying the second synthesized image in a remote video window of the current video call.

8. The information interaction method of claim 1, further comprising:
in response to a second interaction instruction, acquiring a pre-stored three-dimensional human model diagram of a local user from the local terminal, or performing image acquisition to acquire the three-dimensional human model diagram of the local user;
in response to a second selection instruction, acquiring a three-dimensional model diagram of a commodity corresponding to the second selection instruction;
synthesizing the three-dimensional human model diagram and the three-dimensional model diagram of the commodity to generate a first synthesized model diagram; and
displaying the first synthesized model diagram in the local video window, and sending the first synthesized model diagram to the remote terminal or the server.

9. The information interaction method of claim 1, further comprising:
in response to a window creation instruction, creating a sharing window in the interface of the video call; and
in response to an information sharing instruction, displaying to-be-shared information corresponding to the information sharing instruction in the sharing window, the information displayed in the sharing window being configured to be shared between the local terminal and the remote terminal.

10. The information interaction method of claim 9, wherein the information sharing instruction is an instruction generated by performing a first preset operation on a file in the local terminal or the remote terminal; and the to-be-shared information comprises a file corresponding to the first preset operation.

11. The information interaction method of claim 9, wherein the information sharing instruction comprises: a first sharing instruction and a second sharing instruction, the first sharing instruction is an instruction generated by performing a second preset operation on a preset human model diagram in the local terminal or the remote terminal, and the second sharing instruction is an instruction generated by performing a third preset operation on the shopping interface; and the, in response to an information sharing instruction, displaying to-be-shared information corresponding to the information sharing instruction in the sharing window specifically comprises:
in response to the first sharing instruction, displaying a preset human model diagram corresponding to the first sharing instruction in the sharing window; and
in response to the second sharing instruction, synthesizing a three-dimensional model diagram of a commodity corresponding to the second sharing instruction and a preset human model diagram in the sharing window to generate a second synthesized model diagram, and sending the second synthesized model diagram to the sharing window.

12. The information interaction method of claim 1, further comprising:
in the process of the video call, in response to a third interaction instruction, performing split-screen display on the display screen to form at least a third split screen and a fourth split screen;
wherein the third split screen is configured to display the local video window, and the fourth split screen is configured to display the remote video window;
in response to an acquisition instruction, acquiring an image of a target object from images displayed in the remote video window; and
synthesizing the image of the target object and an image in the local video window, and performing video transmission with the remote terminal based on the synthesized image.

13. The information interaction method of claim 12, wherein the acquisition instruction is an instruction generated according to a second sliding operation on the display screen; and
the synthesizing the image of the target object and an image in the local video window specifically comprises:
according to a moving path of the second sliding operation, determining a target placement position of the image of the target object in the image in the local video window; and
according to the target placement position, synthesizing the image of the target object and the image in the local video window.

14. The information interaction method of claim 13, wherein the, according to the target placement position, synthesizing the image of the target object and the image in the local video window specifically comprises:

in response to that a definition adjustment instruction is received, performing definition enhancement processing on the image of the target object to obtain a first image, and performing definition reduction processing on the image in the local video window to obtain a second image; and
covering the first image on a target placement position of the second image according to the target placement position.

15. The information interaction method of claim 12, wherein the performing video transmission with the remote terminal based on the synthesized image specifically comprises:
in response to a privacy transmission instruction, displaying the synthesized image in the third split screen, performing image processing on the synthesized image, and sending the processed image to the remote terminal or the server.

16. The information interaction method of claim 13, wherein after determining the target placement position of the image of the target object in the image in the local video window, the method further comprises:
performing image recognition on the image in the local video window, and acquiring a size of an accommodating space at the target placement position, wherein the accommodating space is a space for placing the target object; and
determining whether the target object matches the accommodating space according to a size of the target object and the size of the accommodating space; and in response to that the target object does not match the accommodating space, generating a recommendation message or a reminding message.

17. A non-transitory computer-readable storage medium, storing a computer program thereon, the computer program, when executed by a processor, implements the information interaction method of claim 1.

18. A communication terminal, comprising:
a memory storing a computer program thereon and a processor, the computer program, when executed by the processor, implements the information interaction method of claim 1.

19. An information interaction method, applied to a local terminal and comprising:
in a process of a video call with a remote terminal, in response to a first interaction instruction, performing split-screen display on a display screen of the local terminal to form at least a first split screen and a second split screen, wherein the first split screen is configured to display an interface of the video call, and the second split screen is configured to display a shopping interface;
in response to a first selection instruction, acquiring an image of a commodity corresponding to the first selection instruction; wherein the first selection instruction is an instruction of selecting the commodity from the shopping interface; and
displaying a synthesized image, wherein the synthesized image is an image obtained by performing image synthesis on the image of the commodity and at least a part of images in the interface of the video call,
wherein the interface of the video call comprises: a local video window and a remote video window; and the information interaction method further comprises:

in the process of the video call, in response to a third interaction instruction, performing split-screen display on the display screen to form at least a third split screen and a fourth split screen;

wherein the third split screen is configured to display the local video window, and the fourth split screen is configured to display the remote video window;

in response to an acquisition instruction, acquiring an image of a target object from images displayed in the remote video window; and synthesizing the image of the target object and an image in the local video window, and performing video transmission with the remote terminal based on the synthesized image.

* * * * *